(12) United States Patent
Jedrzejowski et al.

(10) Patent No.: US 10,710,663 B2
(45) Date of Patent: Jul. 14, 2020

(54) TWO-WHEELED VEHICLE FRAME, IN PARTICULAR FOR A PEDELEC

(71) Applicants: Rehau AG + Co, Rehau (DE); Technische Universität Dresden, Dresden (DE); Storck Bicycle GmbH, Idstein (DE)

(72) Inventors: Andreas Jedrzejowski, Hof (DE); Christian Garthaus, Dresden (DE); Martin Pohl, Dresden (DE); Michael Stegelmann, Dresden (DE); Michael Krahl, Dresden (DE); Werner Hufenbach, Dresden (DE); Georg Luttermann, Münster (DE); Jens Buder, Chemnitz (DE)

(73) Assignees: REHAU AG + CO, Rehau (DE); TECHNISCHE UNIVERSITÄT DRESDEN, Dresden (DE); STORCK BICYCLE GMBH, Idstein (DE)

( * ) Notice: Subject to any disclaimer, the term of this patent is extended or adjusted under 35 U.S.C. 154(b) by 183 days.

(21) Appl. No.: 15/744,872

(22) PCT Filed: Jul. 13, 2016

(86) PCT No.: PCT/EP2016/001213
§ 371 (c)(1),
(2) Date: Jan. 15, 2018

(87) PCT Pub. No.: WO2017/008908
PCT Pub. Date: Jan. 19, 2017

(65) Prior Publication Data
US 2018/0208262 A1  Jul. 26, 2018
US 2019/0023343 A9  Jan. 24, 2019

(30) Foreign Application Priority Data
Jul. 14, 2015  (DE) .................. 20 2015 103 688 U

(51) Int. Cl.
*B62K 3/02* (2006.01)
*B62K 19/00* (2006.01)
(Continued)

(52) U.S. Cl.
CPC ............... *B62K 3/02* (2013.01); *B62K 19/00* (2013.01); *B62K 19/16* (2013.01); *B62K 19/18* (2013.01)

(58) Field of Classification Search
CPC ........ B62K 19/16; B62K 19/18; B62K 19/00; B62K 19/02
See application file for complete search history.

(56) References Cited

U.S. PATENT DOCUMENTS 5,273,303 A * 12/1993 Hornzee-Jones ...... B62K 19/16
280/274
D364,365 S * 11/1995 Lin ........................... 280/281.1
(Continued)

OTHER PUBLICATIONS

International Search Report, International patent application No. PCT/P2016/001213, dated Oct. 25, 2016.

*Primary Examiner* — Jacob D Knutson
*Assistant Examiner* — Michael R Stabley
(74) *Attorney, Agent, or Firm* — Da Vinci Partners LLC; John Moetteli

(57) ABSTRACT

The invention relates to a two-wheeled vehicle frame with two frame half-shells (1, 1') which are joined so as to form a support frame (3), thereby forming at least one inner cavity (2). The support frame (3) has at least one separating surface (4) on which the two frame half-shells (1, 1') rest against each other. The support frame (3) preferably has receiving areas (5, 6, 7) for a handlebar tube and/or a bottom bracket and/or an operator seat tube. The support frame (3) forms a rear structure (8) for assembling a rear wheel (9) at the rear end when seen in the travel direction (z). In order to form the rear structure (8), a left-hand support brace (10) when seen
(Continued)

in the travel direction (z) and a right-hand support brace (11) when seen in the travel direction (z) are provided such that the rear wheel (8) can be mounted between the two support braces (10, 11). According to the invention, the separating surface (4) runs between the two frame half-shells (1, 1') as well as through the left-hand support brace (10) and through the right-hand support brace (11).

16 Claims, 4 Drawing Sheets

(51) Int. Cl.
  *B62K 19/16* (2006.01)
  *B62K 19/18* (2006.01)

(56) References Cited

U.S. PATENT DOCUMENTS

| | | | | |
|---|---|---|---|---|
| 5,544,907 | A | * | 8/1996 | Lin ................. B29C 70/342 |
| | | | | 280/283 |
| 5,769,442 | A | | 6/1998 | Robinson et al. |
| 6,017,048 | A | | 1/2000 | Fritschen |
| 6,203,042 | B1 | * | 3/2001 | Wilcox ............... B62K 25/286 |
| | | | | 280/275 |
| 6,955,372 | B1 | | 10/2005 | Fritschen |
| 8,950,772 | B1 | * | 2/2015 | Yarberry .............. B62K 19/02 |
| | | | | 280/283 |

* cited by examiner

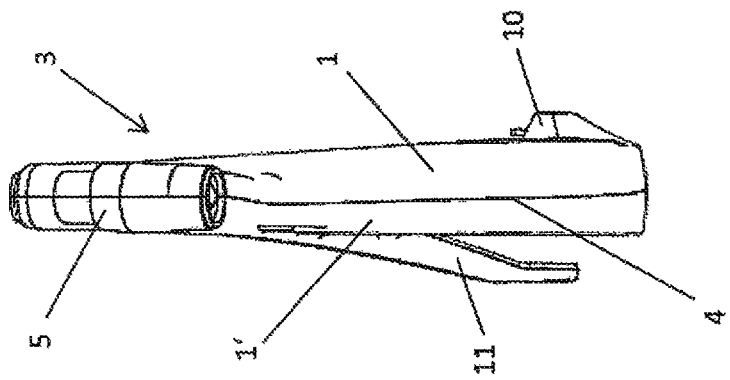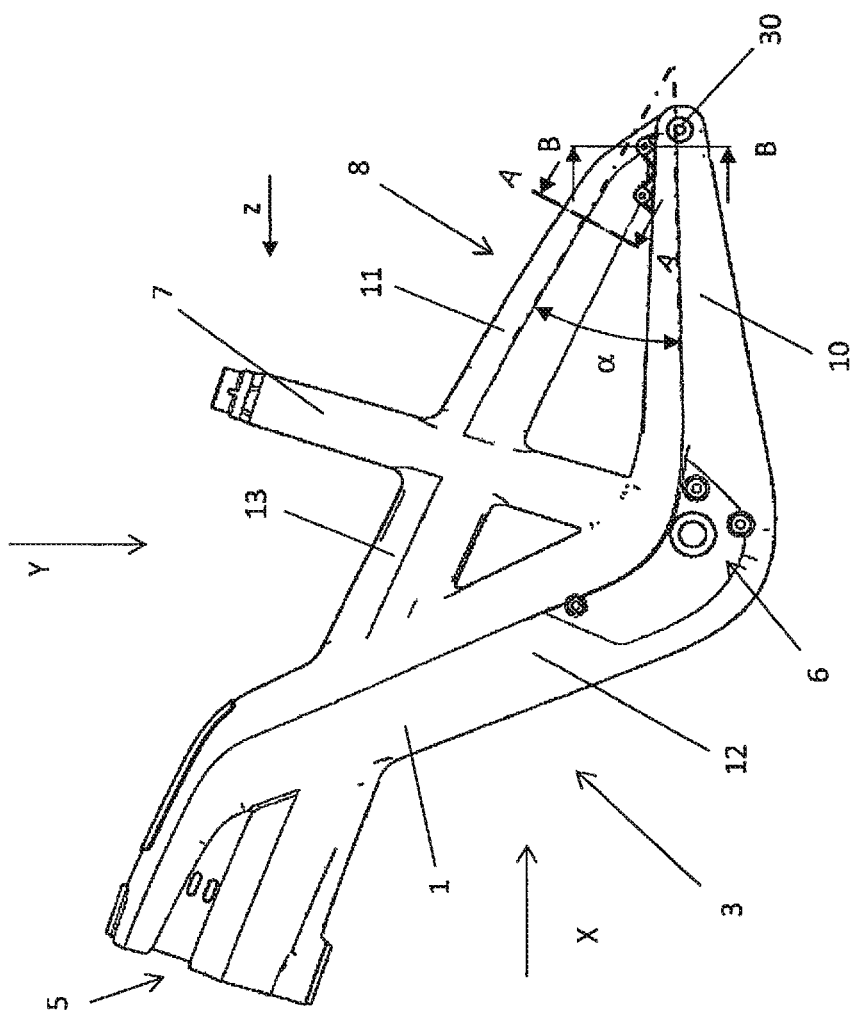

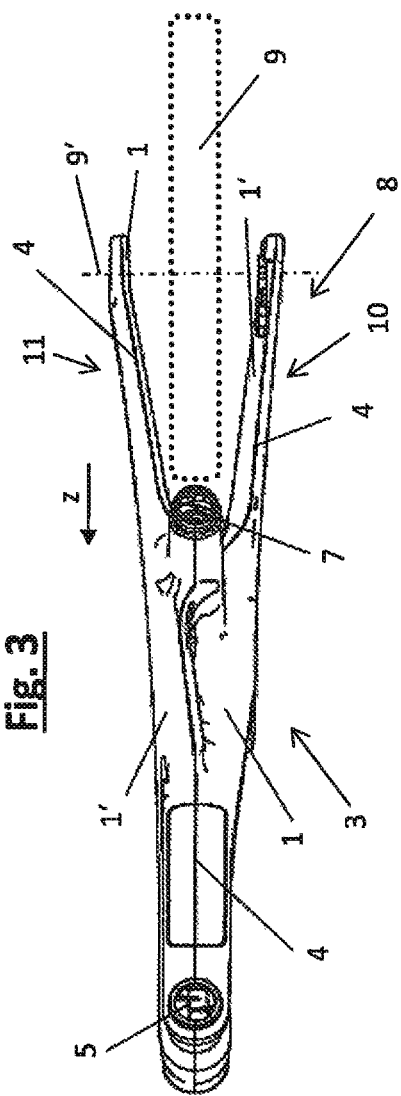
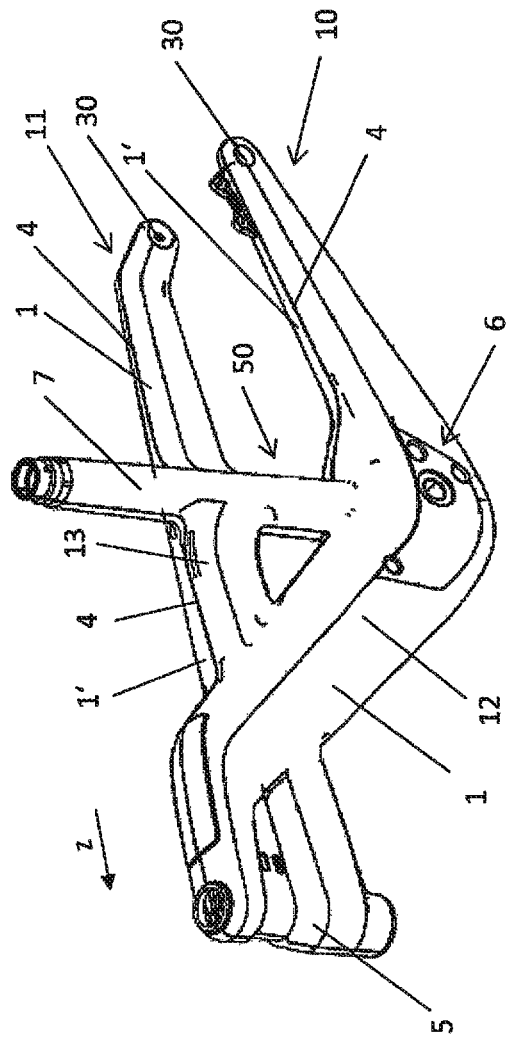
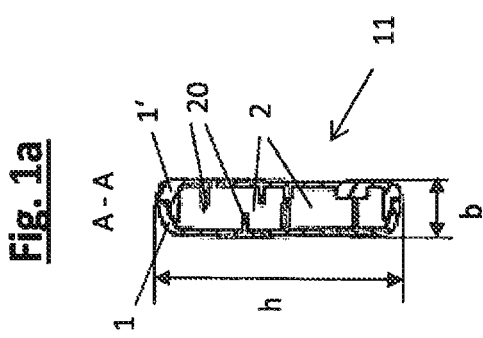
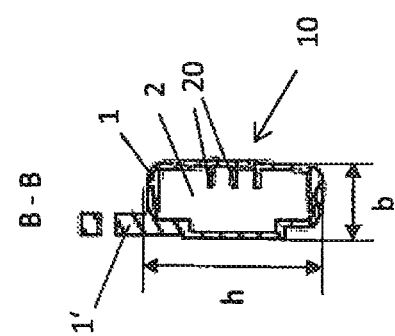

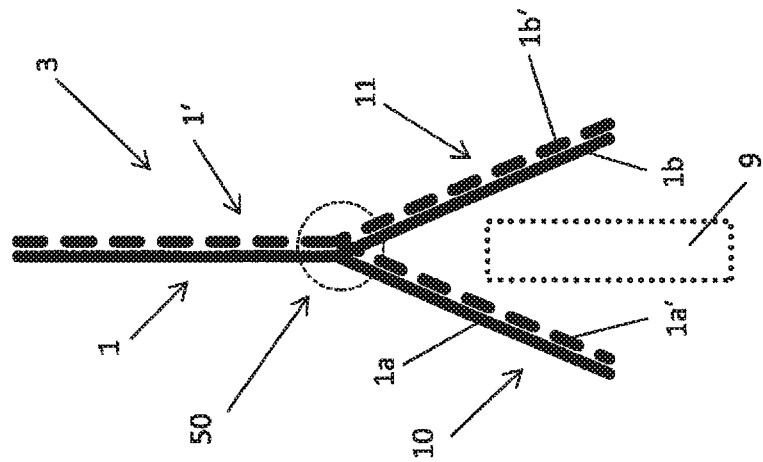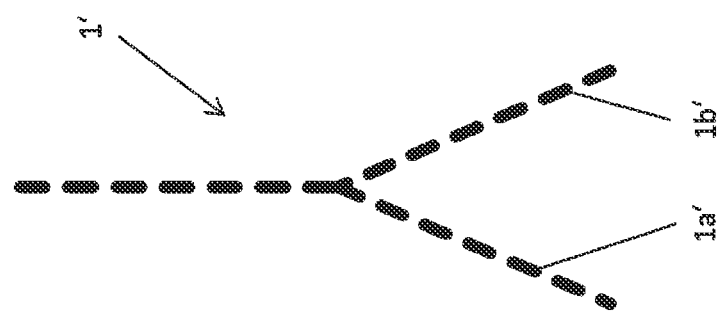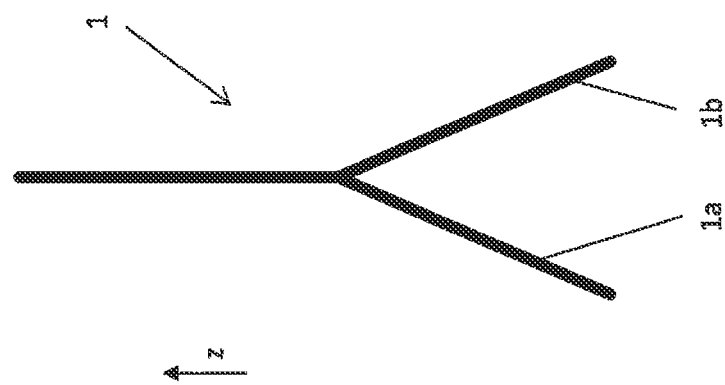

TWO-WHEELED VEHICLE FRAME, IN PARTICULAR FOR A PEDELEC

CROSS REFERENCE TO RELATED APPLICATIONS

This application is the National Stage of International Application No. PCT/EP2016/001213, filed Jul. 13, 2016, which claims benefit under 35 USC § 119(a), to German patent application Ser. No. 20 2015 103 688.4, filed Jul. 14, 2015.

The invention relates to a two-wheeled vehicle frame, in particular for a pedelec,
with two frame half-shells, which are joined so as to form a support frame, thereby forming at least one inner cavity,
the support frame has at least one inner parting plane at which the two frame half-shells rest against each other,
the support frame preferably has receptacles for a handlebar tube and/or a bottom bracket and/or a bicycle seat tube,
at its rear end viewed in the travel direction, the support frame forms a rear structure for mounting a rear wheel, and
in order to form the rear structure, a left support strut viewed in the travel direction and a right support strut viewed in the travel direction are provided such that the rear wheel can be mounted between these two support struts.

Pedelecs differ from a normal bicycle in that they are equipped with additional components. These include an electric motor, at least one battery element for driving the motor, and usually also control electronics for the motor. Preferably, the electric motor can be switched on in order to assist the pedaling force exerted by the rider. The control electronics measures the force exerted or the speed and switches the motor off and on when certain values are achieved. In practice, pedelec frames are frequently made of aluminum. The frame tubes must be produced with a comparatively large diameter in order to be able to accommodate the above-mentioned additional elements. Sometimes, the additional elements are also fastened to the outside of the frames, but this is not very attractive from an esthetic standpoint.

The additional elements also make pedelec frames significantly heavier than normal bicycle frames. There are approaches in which pedelec frames are produced out of two half-shells in which the power-supply elements are stowed. These are disclosed, among other things, in the documents DE 10 2011 053 100 A1 and DE 20 2013 002 987 U1. The latter document has disclosed a pedelec frame that is produced from two half-shells.

When producing a two-wheeled vehicle frame, particularly for a pedelec, having two frame half-shells made of plastic, in the region of the rear structure, which is used for accommodating a rear wheel, there is a fundamental problem that it is not easy to achieve a closed profile construction. The two half-shells are generally produced by injection molding so that there are boundary conditions with regard to their demolding capacity. In practice, this results in the fact that support struts that are made of the half-shells each have an open, for example C-shaped, profile that has significantly reduced strength properties. In order to counteract this problem, additional half-shell elements can be used, which close the open profiles in the vicinity of the support struts of the rear structure. But this involves an increased production expense.

In light of these facts, the object of the present invention is to disclose a two-wheeled vehicle frame, particularly for a pedelec, which has a high mechanical strength in the region of the rear structure and at the same time, is inexpensive to produce.

Based on a two-wheeled vehicle frame with the features described at the beginning, this object is attained according to the invention in that the parting plane between the two frame half-shells extends through both the left support strut and the right support strut. According to the invention, therefore, a departure is taken from the conventional principle of using a single half-shell for fully producing a support strut and closing corresponding structures in the region of the support struts by means of an additional, separate cover element. Instead of this, the two-wheeled vehicle frame is structurally embodied so that the two half-shell concept is also implemented in the two support struts; the support struts are thus integrated into the two half-shell concept. According to the invention, this makes it possible to construct a closed hollow profile in the region of these support struts in that here as well, the hollow profile—analogous to the rest of the frame—is composed of the two frame half-shells.

In order to make this structurally possible, it has turned out to be advantageous for the two frame half-shells for forming the rear structure to split in a forked fashion when viewed from above. In this case, the receptacle for the rider's seat constitutes the branching region. The parting plane between the two frame half-shells preferably extends through the receptacle for the bicycle seat tube, which from a production standpoint, achieves advantages in the injection molding process for producing the two frame half-shells. This advantageously also applies accordingly to the receptacle for the handlebars in the front region of the support frame.

In the context of the invention, it is particularly advantageous to embody the rear structure asymmetrically. This can, for example, be the case because the left and right support struts are oriented offset from each other by an angle $\alpha$ viewed in the plane of the support frame. This concept makes it possible, starting from the front region of the support frame, for sections of the two frame half-shells that serve to form the support struts to extend past each other and particularly when assembled to form the support frame, to cross over each other when viewed from above so that the left frame half-shell viewed in the travel direction also contributes to forming the right support strut and vice versa. The offset angle $\alpha$ is advantageously at least 5°, preferably at least 10°. On the other hand, it is advantageous if the offset angle $\alpha$ is at most 70°, preferably is at most 60°.

In a preferred embodiment of the invention, the right support strut preferably extends diagonally upward from the rear wheel axle while the other support strut has an at least essentially horizontal orientation. This permits the above-described asymmetry, which permits the teaching according to the invention to be implemented in an esthetically elegant fashion. There are also mechanical advantages. Preferably, the front end of the other support strut is adjoined by an upwardly bending intermediate section. In a preferred embodiment of the invention, the receptacle for the bottom bracket is positioned in the connecting region between the intermediate section and the other support strut. The intermediate section and a continuation section of the one support strut then advantageously merge in the front region of the support frame.

The left and right support struts are advantageously each embodied as a closed hollow profile that is composed of the two frame half-shells. In the context of the invention, this particularly means that the height of the hollow profile is at least twice as great, for example at least three times as great, as the width. Preferably, the two frame half-shells are made of plastic. Basically, however, other materials such as aluminum can be used.

On the whole, the teaching according to the invention achieves the fact that the well-proven two half-shell concept can also be implemented in the rear structure for accommodating the rear wheel, without additional cover elements or the like being required for this in addition to the two frame half-shells in the region of the support struts.

The invention will be explained in greater detail below based on the drawings, which show only one exemplary embodiment. In the drawings:

FIG. 1 shows a side view of a two-wheeled vehicle frame according to the invention for a pedelec, having two half-shells;

FIGS. 1a & 1b show the section A-A and B-B, respectively, in FIG. 1,

FIG. 2 shows the view X from FIG. 1;

FIG. 3 shows the top view Y from FIG. 1;

FIG. 4 shows a three-dimensional depiction of the two-wheeled vehicle frame shown in FIG. 1;

FIGS. 6a to 6c each show a very simplified depiction of the half-shell design concept according to the invention in the top view Y, which is implemented in exemplary embodiments according to FIGS. 1 through 5.

Figure 5:
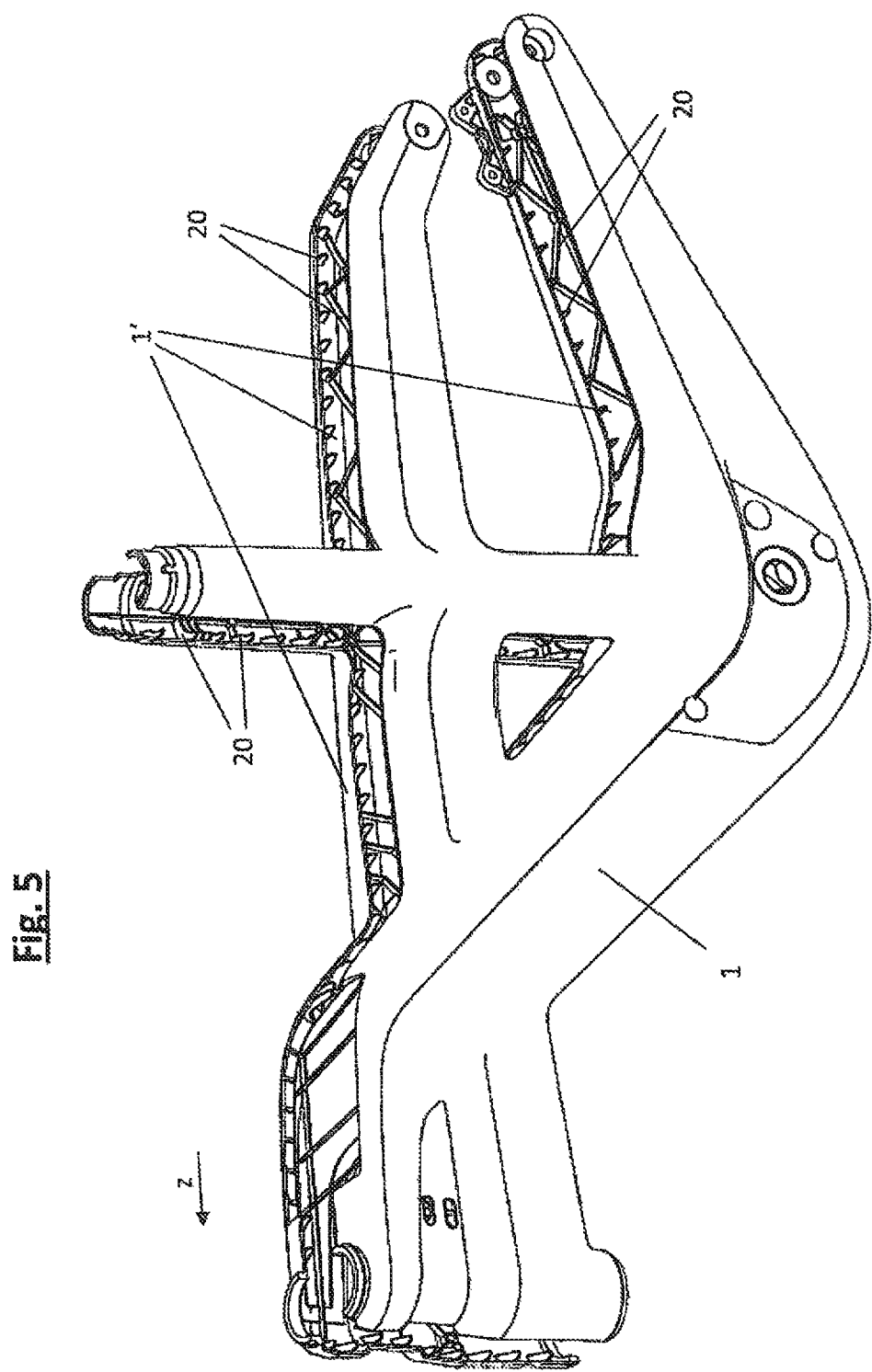
FIG. 5 is a depiction that corresponds to the one in FIG. 4, before the assembly of the two half-shells.

FIG. 1 shows a two-wheeled vehicle frame for a pedelec. The two-wheeled vehicle frame has two frame half-shells 1, 1' made of plastic (in particular, see FIGS. 2 through 5), which are produced by means of an injection-molding process. The frame half-shells 1, 1' are assembled into a support frame 3, thereby forming a plurality of inner cavities 2 (e.g. see FIGS. 1a & 1b). The support frame 3 consequently has an inner parting plane 4 (see FIGS. 2 & 3 among others) at which the two frame half-shells 1, 1' rest against each other. As is clear from a comparative consideration of FIGS. 1 through 5, the support frame 3 has a handlebar tube receptacle 5 a bottom bracket receptacle 6, and a bicycle seat tube receptacle 7. At its rear end viewed in the travel direction z, the support frame 3 forms a rear structure 8 for mounting a rear wheel 9 (indicated in FIGS. 3 and 6c). To form the rear structure 8, a left support strut 10 viewed in the travel direction z and a right support strut 11 viewed in the travel direction z are provided such that the rear wheel 9 can be mounted between these two support struts 10 and 11. This situation can be inferred in particular from FIG. 3. In order to mount the axle 9' of the rear wheel 9, the two support struts 10 and 11 each have a receiving opening 30 at their respective rear ends. According to the invention, the parting plane 4 extends between these two frame half-shells 1, 1' and also extends through the left support strut 10 and the right support strut (in particular, see FIGS. 3 and 4).

From a design standpoint, this is enabled by the fact that the two frame half-shells 1, 1' each split in fork fashion in a view Y from above in order to form the rear structure 8. In this case, the receptacle 7 for the rider's seat tube (not shown) constitutes the branching region 50. When assembled to produce the support frame 3, this results in the fact that the two frame half-shells 1, 1' cross over each other in the view Y from above. This makes it possible for the left frame half-shell 1 viewed in the travel direction z to also contribute to forming the right support strut 11 viewed in the travel direction z and for the right frame half-shell 1' to also correspondingly form a half-shell for forming the left support strut 10 viewed in the travel direction z (see FIGS. 1a and 1b).

As can be inferred in particular from a combined consideration of FIGS. 1, 2, 4, and 5, the rear structure 8 is asymmetrically designed in that the left support strut 10 and the right support strut 11, viewed in the plane of the support frame, are oriented offset from each other by an angle α. In the exemplary embodiment, this offset angle α is approx. 30° (see FIG. 1). It is clear that the right support strut 11 viewed in the travel direction z extends diagonally upward starting from its opening 30, i.e. the rear wheel axle 9', whereas the left support strut 10 has an essentially horizontal orientation. The front end of the left support strut 10 is adjoined by an upwardly bending intermediate section 12. The receptacle 6 for the bottom bracket (not shown) is positioned in the connecting region between the left support strut 10 and the intermediate section 12. The intermediate section 12 and a continuation section 13 of the right support strut 11 merge in the front region of the support frame 3.

Both the left support strut 10 and the right support strut 11 are each embodied as a closed hollow profile that is composed of one of the two frame half-shells 1, 1'. This can be inferred in particular from the sectional depictions in FIGS. 1a, 1b. The two frame half-shells 1, 1' can be connected by means of conventional joining processes such as gluing, clipping, welding, or any combination of these above-mentioned measures. In the sectional depiction B-B according to FIG. 1b, the height h of the hollow profile is more than twice as great as the width b. In the sectional depiction A-A according to FIG. 1a, the ratio h/b is greater than 3. The sectional depictions in FIGS. 1a and 1b and particularly FIG. 5 show that the two frame half-shells 1, 1' have inner reinforcing ribs 20 to increase their mechanical strength.

The basic design principle of the teaching according to the invention is schematically depicted once again in FIGS. 6a through 6c. FIG. 6a shows the left frame half-shell 1 viewed in the travel direction z and its two sections 1a and 1b that contribute to forming the support struts 10 and 11 are each indicated with dashed lines. FIG. 6b then shows the right frame half-shell 1' with the corresponding sections 1a' and 1b'. FIG. 6c shows the two frame half-shells 1, 1' after they are assembled to form the support frame 3. It is clear that in the branching region 50 (depicted by the dashed circle), the sections 1b and 1a' of the two frame half-shells 1, 1' cross over each other so that the sections 1b and 1a' that serve to form the two support struts 10, 11 can extend past each other. FIG. 6c also shows that by means of section 1a, the left frame half-shell 1 contributes to forming the left support strut 10 and by means of section 1b, it contributes to forming the right support strut 11. This applies analogously for the right frame half-shell 1' whose section 1b' contributes to forming the right support strut 11 and whose section 1a' contributes to forming the left support strut 10. In this way, it is possible to achieve a closed hollow profile in both the left support strut 10 and the right support strut 11 (FIGS. 1a and 1b) without additional cover elements or the like being required for this. FIG. 6c also shows the rear wheel 8, which can be mounted after assembly of the two frame half-shells 1, 1'.

The invention claimed is:

1. A two-wheeled vehicle frame suitable for a pedelec, with two frame half-shells, which are joined so as to form a support frame, thereby forming at least one inner cavity, the support frame has at least one inner parting plane at which the two frame half-shells rest against each other, the support frame forms a rear structure for mounting a rear wheel, and in order to form the rear structure, a left support strut viewed in the travel direction and a right support strut viewed in the travel direction are provided such that the rear wheel can be mounted between these two support struts, wherein the parting plane between the two frame half-shells extends through both the left support strut and the right support strut and wherein the rear structure is embodied asymmetrically in that the left support strut and the right support strut are oriented offset from each other by an angle (α) viewed in the plane of the support frame and wherein one support strut, extends diagonally upward from the rear wheel axle while the other support strut has an at least essentially horizontal orientation.

2. The two-wheeled vehicle frame according to claim 1, wherein the two frame half-shells split in fork fashion in a view from above in order to form the rear structure.

3. The two-wheeled vehicle frame according to claim 2, wherein the receptacle for the rider's seat constitutes the branching region.

4. The two-wheeled vehicle frame according to claim 1, wherein the rear structure is embodied asymmetrically in that the left support strut and the right support strut are oriented offset from each other by an angle (a) viewed in the plane of the support frame, wherein the offset angle (α) is at least 5°.

5. The two-wheeled vehicle frame of claim 4, wherein the offset angle (α) is at most 70°.

6. The two-wheeled vehicle frame of claim 4, wherein the offset angle (α) is at most 60°.

7. The two-wheeled vehicle frame according to claim 1, wherein the rear structure is embodied asymmetrically in that the left support strut and the right support strut are oriented offset from each other by an angle (α) viewed in the plane of the support frame, wherein the offset angle (α) is at most 70°.

8. The two-wheeled vehicle frame according to claim 1, wherein one support strut, preferably the right support strut, extends diagonally upward from the rear wheel axle while the other support strut has an at least essentially horizontal orientation, wherein the front end of the other support strut is adjoined by an upwardly bending intermediate section.

9. The two-wheeled vehicle frame according to claim 8, wherein the support frame includes a bottom bracket, a connecting region and a receptacle for a bottom bracket, and wherein the receptacle is positioned in the connecting region between the intermediate section and the other support strut.

10. The two-wheeled vehicle frame according to claim 9, wherein the intermediate section and a continuation section of the one support strut merge in the front region of the support frame.

11. The two-wheeled vehicle frame according to claim 1 wherein the left support strut and right support strut are each embodied as a closed hollow profile that is composed of the two frame half-shells.

12. The two-wheeled vehicle frame according to claim 11, wherein the height (h) of the hollow profile is at least twice as great, as the width (b).

13. The two-wheeled vehicle frame of claim 11 wherein the height (h) of the hollow profile is at least three times as great as the width.

14. The two-wheeled vehicle frame according to claim 1 wherein the frame half are made of plastic.

15. The two-wheeled vehicle frame according to claim 1, wherein the rear structure is embodied asymmetrically in that the left support strut and the right support strut are oriented offset from each other by an angle (α) viewed in the plane of the support frame, wherein the offset angle (α) is at least 10°.

16. The two-wheeled vehicle frame according to claim 1, wherein the rear structure is embodied asymmetrically in that the left support strut and the right support strut are oriented offset from each other by an angle (α) viewed in the plane of the support frame, wherein the offset angle (α) is at most 60°.

* * * * *